United States Patent [19]

Gilmore

[11] Patent Number: 4,569,190
[45] Date of Patent: Feb. 11, 1986

[54] TWISTED CABLE ASSEMBLY AND A METHOD OF MAKING THE SAME
[75] Inventor: William J. Gilmore, Manitou Beach, Mich.
[73] Assignee: Acco Babcock Inc., Fairfield, Conn.
[21] Appl. No.: 574,687
[22] Filed: Jan. 27, 1984
[51] Int. Cl.[4] ............... B60R 22/20; A62B 35/00; F16L 21/00
[52] U.S. Cl. ........................................ 57/201; 57/21; 57/212; 297/468; 403/292; 403/300
[58] Field of Search ............ 57/201, 213, 216, 220, 57/222, 3, 11, 12, 21, 212; 428/377; 24/115 N, 129 W, 122.3, 122.6; 294/74; 297/468, 482; 403/300, 305, 223, 292

[56] References Cited

U.S. PATENT DOCUMENTS

| 1,835,068 | 12/1931 | Livermore | 24/122.3 |
|---|---|---|---|
| 2,109,717 | 3/1938 | Arnold | 57/21 |
| 2,736,398 | 2/1956 | Peterson | 57/202 |
| 2,805,540 | 9/1957 | Thompson | 57/201 |
| 3,079,192 | 2/1963 | Otley | 294/74 |
| 3,222,858 | 12/1965 | Gilmore et al. | 57/201 |
| 3,469,338 | 9/1969 | Hills | 403/300 X |
| 3,692,361 | 9/1972 | Ivarsson | 297/482 |
| 3,785,701 | 1/1974 | Gilmore | 297/481 |
| 4,119,344 | 10/1978 | Kondo | 297/482 X |
| 4,137,115 | 1/1979 | Lambert | 403/292 X |
| 4,199,190 | 4/1980 | Lindblad | 297/468 |

FOREIGN PATENT DOCUMENTS 468595  7/1937  United Kingdom .

Primary Examiner—Stuart S. Levy
Assistant Examiner—Joseph J. Hail, III
Attorney, Agent, or Firm—Pennie & Edmonds

[57] ABSTRACT

A twisted cable assembly and a method of making the same. The cable assembly comprises first and second spaced apart end spools and a continuous length of wire. The wire is looped around and extends between the end spools, and sections of the wire between the end spools are twisted into a composite strand. With one embodiment, an elongated malleable wire also is connected to and extends between the end spools to hold the cable assembly selectively in a range of curved positions. With an alternate embodiment, a stiffening wire is connected to and extends between the end spools to inhibit bending of the cable assembly.

17 Claims, 11 Drawing Figures

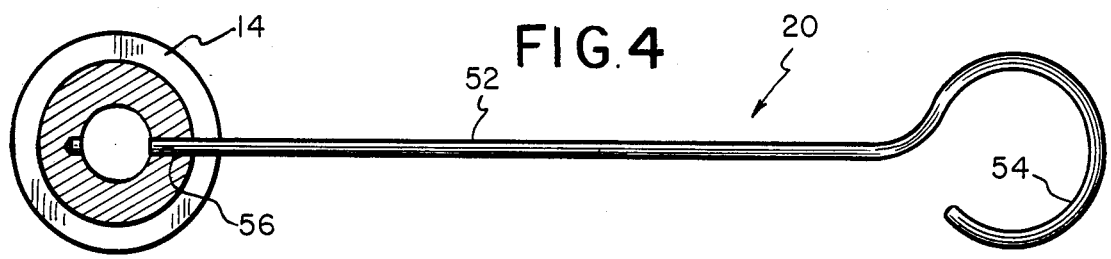
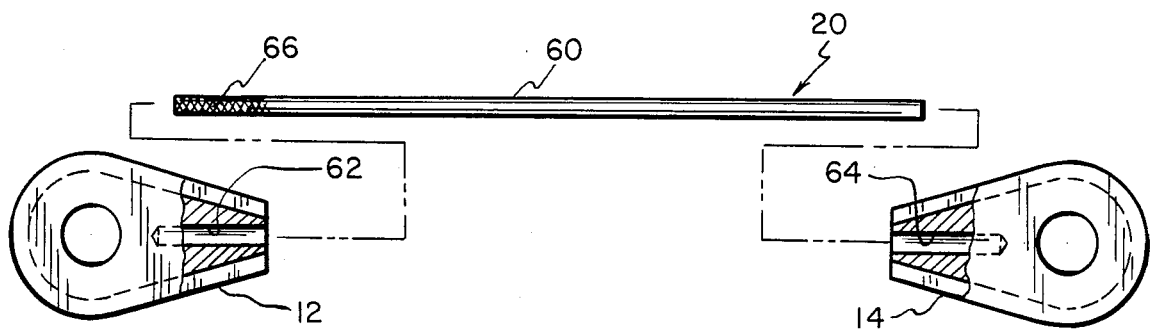
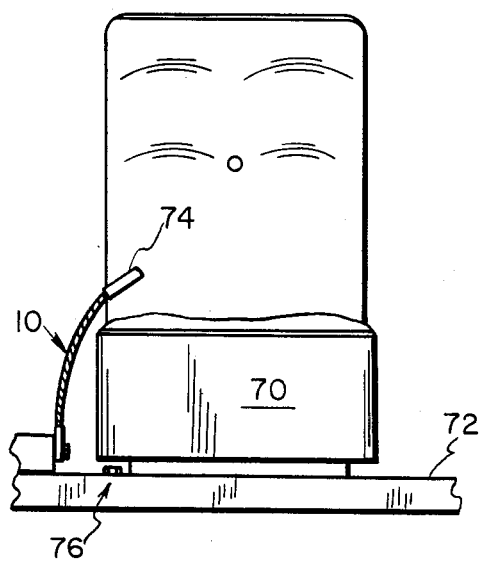
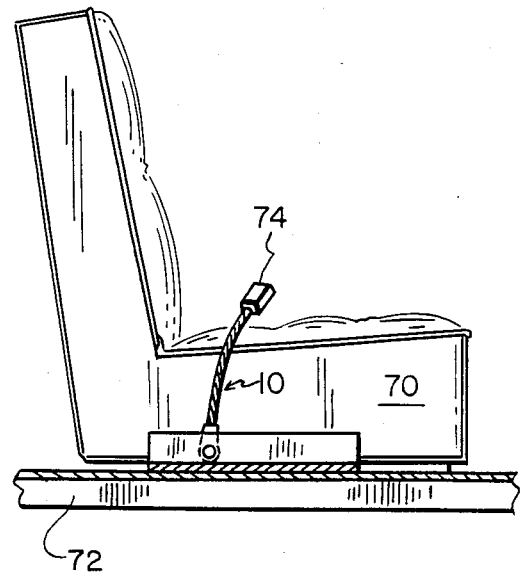

4,569,190

TWISTED CABLE ASSEMBLY AND A METHOD OF MAKING THE SAME

BACKGROUND OF THE INVENTION

This invention generally relates to cable assemblies, and more specifically, to cable assemblies of the type used to anchor seat belts to vehicles.

Seat belts are widely used to secure personnel in seats such as airplane and automobile seats. One type of seat belt, for example, comprises two straps, a buckle, and a tongue. The buckle is secured to a first end of one strap, and the tongue is secured to the first end of the other strap. Second ends of both straps are anchored to a vehicle structure adjacent to a seat thereof. A person secures himself or herself within the seat by extending at least one of the straps in front of himself or herself and inserting the tongue of the seatbelt into the buckle thereof. Means are provided to disconnect the tongue from the buckle, and to adjust the length or tension of the belt. Various means, such as a twisted wire cable assembly, may be used to anchor the seatbelt to the vehicle structure. One twisted wire cable assembly, which is well suited for this purpose, and methods of making such a cable assembly, are described in detail in U.S. Pat. No. 3,222,858.

When these seatbelts are not in use, the tongue and buckle are not held in any particular position, and normally the buckle and tongue just lie loosely on or adjacent to the vehicle seat. To use such a seat belt, an individual must first locate and grab both the buckle and the tongue and then connect the two together.

With other types of seatbelts, the buckle is connected to the vehicle structure by means of an arm assembly which keeps the buckle at, or within a relatively narrow range of, one, fixed location in which the buckle is comparatively easy to find and use. This, obviously, makes it easier for the wearer to use the seatbelt, and encourages people to do so. Prior art seat belts, though, have not been generally designed to hold the buckle selectively in any one of a variety or range of positions, and thus cannot be individually adjusted for each person who uses a seatbelt to maximize the ease and convenience with which that person can insert the tongue into the buckle.

SUMMARY OF THE INVENTION

The present invention relates to twisted wire cable assemblies especially well suited for anchoring seat belt buckles to vechicle structures. One embodiment of the present invention may be used to maintain the buckle selectively in a range of positions. A second embodiment of the invention may be employed to hold the buckle securely in a single, fixed location.

More specifically, the cable assemblies of this invention comprise first and second spaced apart end spools and a continuous length of wire. This length of wire is disposed alongside itself in a plurality of substantially overlaid runs of similar configurations. These runs form a pair of spaced, closed loop sections and a corresponding pair of intermediate sections. A first loop section extends around a first spool, and a second loop section extends around the second spool. The intermediate sections of the runs are longitudinally twisted into a composite strand.

In accordance with a first aspect of this invention, an elongated malleable means is connected to and extends between the spools of the cable assembly to hold that assembly selectively in a range of curved positions. When used to anchor a seatbelt buckle to a vehicle structure, the position or shape of this cable assembly may easily be adjusted to vary the position, location, and orientation of the buckle. Different seatbelt buckles can be individually adjusted for different people to maximize the convenience with which each person can grab and operate the buckle of his or her seatbelt.

Pursuant to another part of the present invention, a high tensile wire is connected to and extends between the spools of the cable assembly to hold the cable assembly in a straight position. When used to connect a buckle of a seatbelt to a vehicle structure, this cable assembly inhibits inadvertent swinging or flexing of the seatbelt, insuring that the buckle is maintained in a fixed, straight position. At the same time, this cable assembly is very simple, inexpensive, and practical to make and install.

A BRIEF DESCRIPTION OF THE DRAWINGS

FIGS. 4 and 5 show first and second alternate elongated malleable means which may be used in this invention.

FIGS. 6 and 7 are front and side views respectively illustrating a particular application of the cable assembly shown in FIGS. 1 and 2.

A DETAILED DESCRIPTION OF THE PREFERRED EMODIMENTS

Figure 1:
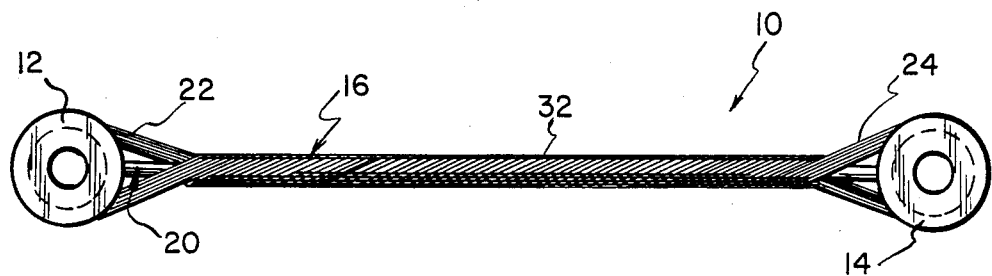
FIG. 1 illustrates a cable assembly constructed in accordance with the present invention.
Figure 2:
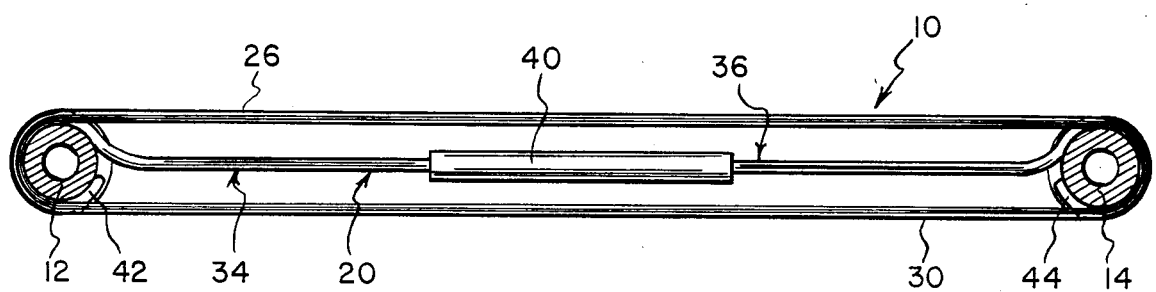
FIG. 2 shows the cable assembly of FIG. 1 immediately prior to formation of the twisted, composite strand of that assembly.

With particular reference to FIGS. 1 and 2, cable assembly 10 generally comprises first and second spaced bushings or spools 12 and 14, a continuous length of wire 16, and elongated malleable means 20. Continuous wire 16 is disposed alongside itself in a plurality of substantially overlaid runs of similar configuration. In the final assembly shown in FIG. 1, these runs describe a pair of spaced, closed loop sections 22 and 24. A first loop section 22 extends around first spool 12, and second loop section 24 extends around second spool 14. The runs of wire 16 also form a pair of corresponding intermediate sections 26 and 30 that, as shown in FIG. 1, are longitudinally twisted about each other into composite strand 32.

Wire 16 may be wrapped around end spools 12 and 14 and composite strand 32 may be formed from intermediate sections 26 and 30 in any suitable manner, for instance as explained in detail in U.S. Pat. No. 3,222,858. Because techniques and procedures for mounting and twisting wire 16 to form the final, assembled position shown in FIG. 1 are very well known, it is believed unnecessary to describe those techniques and procedures herein in detail.

Elongated malleable means 20 is connected to and extends between end spools 12 and 14 to hold cable assembly 10 selectively in a range of curved or bent positions. Malleable means 20 comprises a wire, preferably a mono-filament wire, of soft annealed steel. As is understood by those skilled in the art, such a wire can be manually forced into a bent or curved shape, and will maintain that shape for an indefinite time, until forced into another shape. The wire can be manipulated in this manner through a wide range of positions. Of course, as the soft annealed wire is forced into a curved position, the entire cable assembly 10 is also forced into a particular position; and the annealed wire maintains the whole cable assembly in that particular position until the wire and the cable assembly are forced into another position.

Malleable means 20 is connected to spools 12 and 14 and is secured in place within cable assembly 10 prior to the twisting of the intermediate sections 26 and 30 into composite strand 32. As intermediate sections 26 and 30 of wire 16 are twisted into composite strand 32, spools 12 and 14 rotate relative to each other, about the longitudinal axis of cable assembly 10, either to cause, or as a result of, the twisting of wire 16.

It is desirable to avoid twisting integrally connected portions of malleable means 20 relative to each other as end spools 12 and 14 rotate about the longitudinal axis of cable assembly 10. For this reason, malleable means 20 is connected to end spools 12 and 14 in a manner permitting such rotation of the end spools without requiring twisting of integrally connected portions of the malleable means. Furthermore, as wire 16 is twisted to form composite strand 32, spools 12 and 14 move toward each other along the axis of cable assembly 10. Because of this, it is desirable also either to provide malleable means 20 with a variable length, or to allow limited linear movement between the malleable means and at least one end spool 12 and 14.

Figure 3:
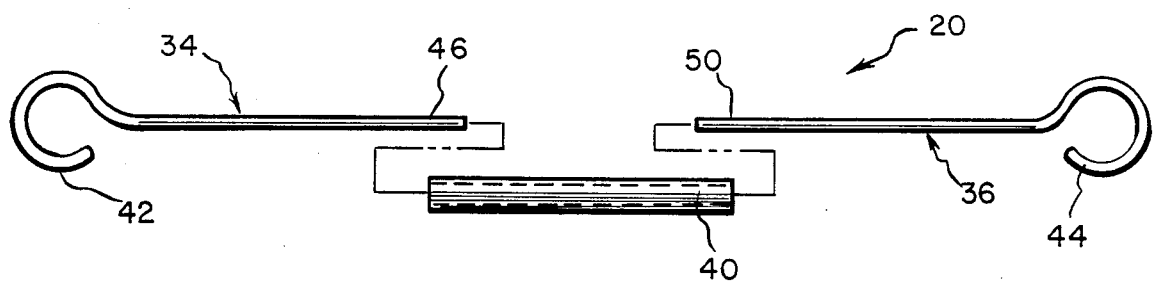
FIG. 3 shows the elongated malleable means of the cable assembly in greater detail.

With the embodiment of the cable assembly 10 shown in FIGS. 1 and 2, the above objectives are accomplished by forming malleable means 20 from first and second discrete sections 34 and 36 and sleeve 40. With reference to FIG. 3, which shows this embodiment of malleable means 20 in greater detail, sections 34 and 36 are substantially identical and each section includes a straight or linear portion and a first end that is shaped into a hook. In assembly, hook 42 of section 34 closely fits around a hub of spool 12 to secure that section of the malleable means 20 to spool 12, and hook 44 of section 36 closely fits around a hub of spool 14 to secure that section of the malleable means to the spool 14. In assembly, linear portions 46 and 50 of sections 34 and 36 are aligned with each other and have adjacent ends, and sleeve 40 closely and concentrically fits over the adjacent ends of the sections 34 and 36. In this way, sleeve 40 connects or couples sections 34 and 36 together while permitting relative rotation therebetween about the longitudinal axis of cable assembly 10. At the same time, sleeve 40 allows, and in fact guides, limited sliding movement of sections 34 and 36 toward and away from each other, allowing the length of malleable means 20 to decrease as composite stand 32 is formed.

Alternately, as shown in FIG. 4, malleable means 20 may comprise a single integral member including a linear portion 52 and a first end that is shaped into hook 54. In assembly, hook 54 closely fits around a hub of first spool 12, and linear portion 52 extends into socket 56 which is formed in second spool 14. The end of linear portion 52 that extends into socket 56 closely, but not tightly, fits against the end and the sides of that socket. This arrangement connects malleable means 20 to spool 14 while permitting that spool to rotate and to move linearly relative to the malleable means about and along, respectively, the longitudinal axis of cable assembly 10.

FIG. 5 shows still another embodiment of malleable means 20. As illustrated therein, malleable means 20 comprises a single integral, linear rod 60. In assembly, a first end of rod 60 extends into socket 62, which is formed in first end spool 12; and a second end of the rod extends into socket 64, which is formed in a second end spool 14. The first end of rod 60 is in a tight, pressure fit with the surfaces of spool 12 forming socket 62, and the second end of the rod closely, but not tightly, fits within socket 64 of spool 14. In this manner, rod 60 is held stationary relative to spool 12 and 14 during use of cable assembly 10, yet spool 14 is able to rotate and to move linearly about and along the axis of rod 60 as the cable assembly is formed. First end of rod 60 may include a roughened portion or raised ridges 66 to help hold that end of the rod tightly within socket 62.

FIG. 6 and 7 show cable assembly 10 holding a seatbelt buckle in a predetermined position. More specifically, FIGS. 6 and 7 show a vehicle seat 70, a portion of a vehicle structure 72 such as a car body, cable assembly 10 and seat belt buckle 74. A first end of assembly 10 is connected to buckle 74 and a second end of the cable assembly is securely connected to vehicle structure 72. The remaining portions of the seat belt are not shown in FIGS. 6 or 7 for the sake of clarity. As is apparent, by bending or otherwise adjusting the shape of cable assembly 10, buckle 74 may easily be selectively maintained in a range of positions. In particular, the position and orientation of buckle 74 may be individually adjusted for each person who uses the seat belt to maximize the ease and convenience with which that person can insert the tongue of the belt into the buckle.

The formability of cable assembly 10 also provides increased flexibility as to where buckle 74 may be anchored to vehicle structure 72 via cable assembly 10. For example, the second end of cable assembly 10 may be connected to the floor of vehicle structure 72 directly below seat 70, in the area referenced by arrow 76, while still holding buckle 74 above seat 70 in the angular orientation shown in FIGS. 6 and 7.

Figure 8:
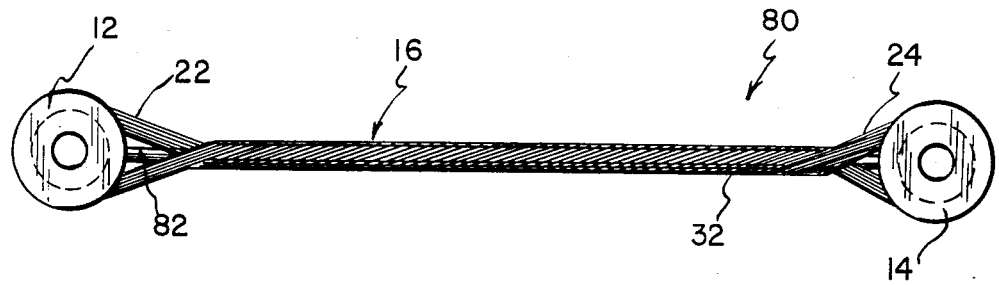
FIG. 8 depicts another cable assembly also constructed in accordance with this invention.
Figure 9:
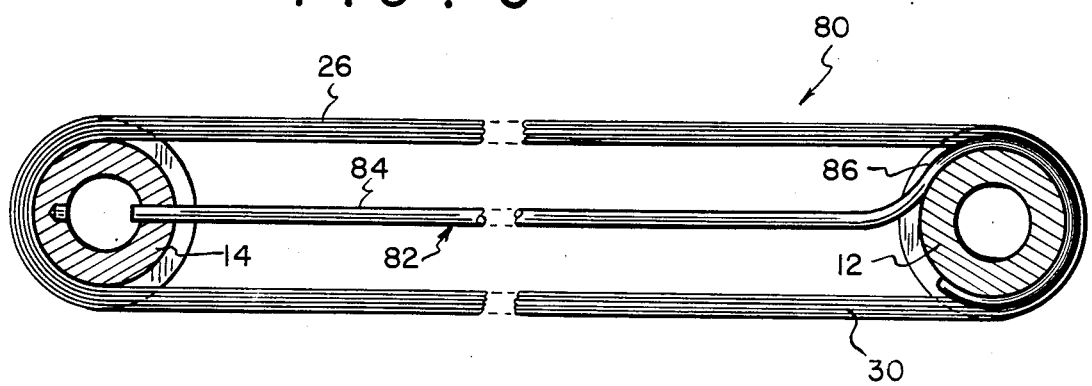
FIG. 9 shows the cable assembly of FIG. 8 immediately prior to the formation of the twisted, composite strand of that assembly.

FIGS. 8 and 9 show twisted cable assembly 80 which is well suited for holding a buckle of a seatbelt in a fixed, nonvariable location. Cable assembly 80 is similar to cable assembly 10 illustrated in FIGS. 1 and 2, and identical elements in the different Figures are given the same reference numeral. In particular, cable assembly 80 comprises end spools 12 and 14 and wire 16, which is looped around the end spools and twisted into composite strand 32. In lieu of malleable means 20, though, cable assembly 80 includes wire means 82 to hold the cable assembly in a straight position. More specifically, wire means 82 is connected to and extends between end spools 12 and 14 and has a high tensile strength to increase the stiffness of cable assembly 80.

Wire means 82 is connected to spools 12 and 14 prior to the twisting of the intermediate sections of wire 16 into composite strand 32. For this reason, as with malleable means 20 of cable assembly 10, wire means 82 of cable assembly 80 is connected to end spools 12 and 14 in a manner permitting the end spools to rotate relative to each other, about the longitudinal axis of cable assembly 80, and also allowing limited linear movement between the end spools along the axis of cable assembly 80.

As will be appreciated, various arrangments may be used to connect wire means 82 to spools 12 and 14 so as to accomplish these features. For instance, the different arrangements discussed above in connection with FIGS. 3, 4, and 5 for connecting malleable means 20 to spools 12 and 14 may also be used to connect wire means 82 to the spools of the cable assembly 80. In particular, wire means 82 may comprise an integral member including linear portion 84 and a first end that is preformed into hook 86. To secure this wire means 82 within cable assembly 80, hook 86 is snapped onto a hub of first end spool 12 and an end of linear portion 84 is inserted into a socket formed in second end spool 14.

Figure 10:
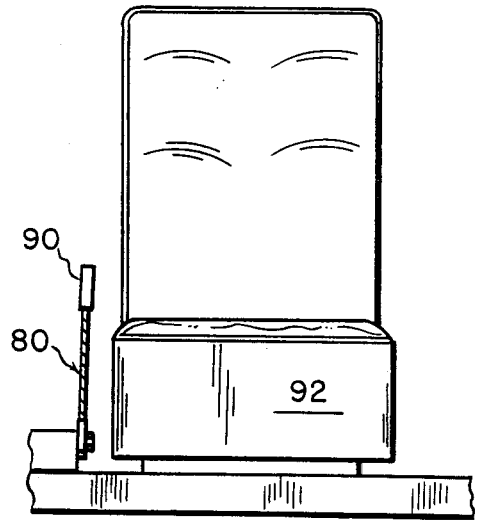
FIGS. 10 and 11 are front and side views respectively showing an application of the cable assembly illustrated in FIGS. 8 and 9.
Figure 11:
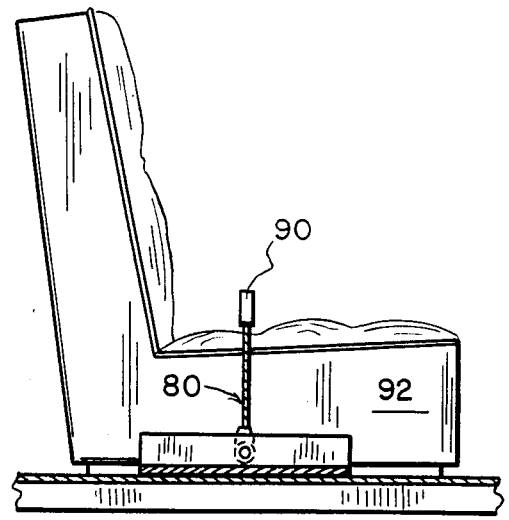

Because of the high stiffness of cable assembly 80, that assembly may be effectively employed, as shown in FIGS. 10 and 11, to hold seatbelt buckle 90 in a predetermined position. In particular, assembly 80 securely holds buckle 90, without additional support, in a fixed, straight position spaced from vehicle seat 92. This position of buckle 90 is chosen to facilitate locating and grabbing the buckle and to assist inserting the tongue of the seatbelt (not shown) into the buckle.

It should be observed that all of the above can be accomplished while, at the same time, cable assembly 80 is relatively simple and inexpensive to manufacture. Also, different cable assemblies 80 can be easily provided with different degress of stiffness simply by using wire means 82 of varying tensile strengths. Moreover, due to practical considerations involving the manufacture and use of cable assembly 80—for example, constraints on the thickness of composite strand 32 and a desire to maintain wire 16 relatively thin in order to facilitate forming the overlaid runs thereof—it is more practical to make a very stiff twisted wire cable assembly by employing elongated wire means 82 as described above than by increasing the thickness of wire 16.

I claim:

1. A twisted cable assembly comprising:
   (a) first and second spaced apart end spools;
   (b) a continuous length of wire disposed alongside itself in a plurality of substantially overlaid runs of similar configuration, the runs forming
      (i) a pair of spaced, closed loop sections, a first loop section extending around the first spool and a second loop section extending around the second spool, and
      (ii) an intermediate section longitudinally twisted into a composite strand; and
   (c) elongated wire means connected directly to and extending between the spools internally of the intermediate section to restrain flexing of the cable assembly.

2. A twisted cable assembly according to claim 1 wherein the elongated wire means comprises a malleable wire to hold the cable assembly selectively in a range of curved positions.

3. A twisted cable assembly according to claim 1 wherein the elongated wire means comprises a stiffening wire to hold the cable assembly in a straight position.

4. A twisted cable assembly according to claim 1 wherein at least one of the end spools is rotatably connected to the elongated wire means for rotation about a longitudinal axis of the cable assembly.

5. A twisted cable asembly according to claim 4 wherein:
   (a) the elongated wire means includes a linear portion;
   (b) the first spool includes a socket; and
   (c) the linear portion of the elongated wire means extends into the socket.

6. A twisted cable assembly according to claim 5 wherein an end of the elongated wire means forms a hook that fits around a second spool.

7. A twisted cable assembly according to claim 4 wherein the elongated wire means includes:
   (a) a first section having
      (i) a first end connected to the first end spool, and
      (ii) a linear portion aligned with the longitudinal axis of the cable assembly;
   (b) a second section having
      (i) a first end connected to the second end spool, and
      (ii) a linear portion aligned with the longitudinal axis of the cable assembly; and
   (c) means coupling the linear portions of the first and second sections together for relative rotational movement about the longitudinal axis of the cable assembly.

8. A twisted cable assembly according to claim 7 wherein the coupling means includes a sleeve closely fitting over ends of the linear portions of the first and second sections.

9. A twisted cable assembly according to claim 8 wherein:
   (a) the first end of the first section forms a hook extending around the first end spool; and
   (b) the first end of the second section forms a hook extending around the second end spool.

10. A twisted cable assembly according to claim 4 wherein:
    (a) the first end spool includes a first socket;
    (b) the second end spool includes a second socket; and
    (c) the elongated wire means comprises a rod having
       (i) a first end extending into the first socket, and
       (ii) a second end extending into the second socket.

11. A twisted cable assembly according to claim 10 wherein the first end of the elongated wire means is securely held within the first socket to inhibit relative linear and rotational movement between the elongated wire means and the first end spool.

12. A twisted cable assembly according to claim 1 wherein the first end of the elongated wire means is in a tight pressure fit with the surfaces of the first end spool forming the first socket.

13. A twisted cable assembly according to any one of claims 1 or 4–10 wherein the elongated wire means longitudinally extends within the composite strand formed by the intermediate sections of the overlaid runs of the wire.

14. A method of making a twisted cable assembly comprising the steps of:
    (a) wrapping a continuous length of wire around a pair of spaced end spools in a plurality of substantially overlaid runs of similar configuration which together describe a pair of end turn sections and a corresponding pair of substantially parallel intermediate sections;
    (b) locating an elongated wire means between the intermediate sections of the overlaid runs;
    (c) connecting the elongated wire means to the end spools; and
    (d) forming a composite twisted strand from the intermediate sections around the elongated wire.

15. A method according to claim 14 wherein the forming step includes the steps of:

(a) rotating at least one of the end spools about the longitudinal axis of the elongated wire means; and (b) sliding at least one of the end spools axially along the elongated wire means.

16. A method according to claim 14 wherein the connecting step includes the step of hooking a first end of the elongated wire means around a first end spool.

17. A method according to claim 16 wherein the connecting step further includes the step of inserting a second end of the elongated wire means into a socket in the second end spool.

* * * * *